(12) United States Patent
Baumann et al.

(10) Patent No.: US 12,133,612 B2
(45) Date of Patent: Nov. 5, 2024

(54) BLADE MEANS FOR A MIXER

(71) Applicant: ZWILLING J.A. Henckels AG, Solingen (DE)

(72) Inventors: Wolfgang Baumann, Ense (DE); René Thyssen, Schwelm (DE)

(73) Assignee: ZWILLING J.A. Henckels AG, Solingen (DE)

( * ) Notice: Subject to any disclaimer, the term of this patent is extended or adjusted under 35 U.S.C. 154(b) by 750 days.

(21) Appl. No.: 17/425,620

(22) PCT Filed: Jan. 7, 2020

(86) PCT No.: PCT/EP2020/050152
§ 371 (c)(1),
(2) Date: Jul. 23, 2021

(87) PCT Pub. No.: WO2020/151935
PCT Pub. Date: Jul. 30, 2020

(65) Prior Publication Data
US 2022/0095841 A1 Mar. 31, 2022

(30) Foreign Application Priority Data
Jan. 25, 2019 (DE) .................. 10 2019 101 823.4

(51) Int. Cl.
*A47J 43/07* (2006.01)
*A47J 43/044* (2006.01)
*B26D 1/00* (2006.01)

(52) U.S. Cl.
CPC ......... *A47J 43/0711* (2013.01); *A47J 43/044* (2013.01); *B26D 1/0006* (2013.01);
(Continued)

(58) Field of Classification Search
CPC .... A47J 43/0711; A47J 43/0722; A47J 19/06; A21C 1/02; B01F 27/1123; B26D 1/0006
See application file for complete search history.

(56) References Cited

U.S. PATENT DOCUMENTS 8,056,848 B1 * 11/2011 Liang ................ A47J 43/0722
366/205
8,132,752 B1 * 3/2012 Hotaling ............ A47J 43/0722
241/292.1
(Continued)

FOREIGN PATENT DOCUMENTS

CN  201578095 U   9/2010
CN  203302918 U   11/2013
(Continued)

OTHER PUBLICATIONS

German Patent and Trademark Office, Search Report, Application No. 102019101823.4, May 2, 2019, 8 pages [No English Language Translation Available].
(Continued)

*Primary Examiner* — Elizabeth Insler
(74) *Attorney, Agent, or Firm* — Quarles & Brady LLP

(57) ABSTRACT

A blade means for a mixer, such as for example an immersion blender or stand mixer includes a rotational shaft; at least one blade which extends from the rotational shaft and has at least one cutting edge; and a plurality of serrations which are formed in the at least one cutting edge. The individual serrations are spaced apart from one another by a planar portion of the at least one cutting edge, wherein the planar portion of the at least one cutting edge is less sharp than the serrations.

10 Claims, 3 Drawing Sheets

(52) U.S. Cl.
CPC .............. *A47J 2043/04427* (2013.01); *B26D 2001/006* (2013.01)

(56) References Cited

U.S. PATENT DOCUMENTS

| | | | |
|---|---|---|---|
| 9,750,372 | B2 | 9/2017 | Foxlee et al. |
| 2017/0208999 | A1 | 7/2017 | Lee |

FOREIGN PATENT DOCUMENTS

| | | | |
|---|---|---|---|
| CN | 103784034 | A | 5/2014 |
| CN | 104689893 | A | 6/2015 |
| CN | 204765239 | U | 11/2015 |
| CN | 205053891 | U | 3/2016 |
| CN | 107616724 | A | 1/2018 |
| DE | 202010008152 | U1 | 12/2010 |
| EP | 2127577 | A1 | 12/2009 |
| EP | 2522262 | A1 | 11/2012 |
| EP | 2679122 | A1 | 1/2014 |
| EP | 3111815 | A1 | 1/2017 |
| JP | S63158028 | A | 7/1988 |
| JP | S63216515 | A | 9/1988 |
| JP | 2002320872 | A | 11/2002 |
| JP | 2003144956 | A | 5/2003 |
| KR | 101064127 | B1 | 9/2011 |
| WO | WO-2018223555 | A1 * | 12/2018 .............. A47J 31/44 |

OTHER PUBLICATIONS

PCT International Search Report and Written Opinion, PCT/EP2020/050152, Mar. 10, 2020, 15 pages.

Taiwan Intellectual Property Office, Application No. 108148725, Dec. 21, 2022, 7 pages [No English Language Translation Available].

China National Intellectual Property Administration, Notice on the First Office Action and Search Report, Application No. 202080010881.9, Sep. 19, 2023, 7 pages [No English Language Translation Available].

* cited by examiner

BLADE MEANS FOR A MIXER

This application represents the U.S. national stage entry of International Application No. PCT/EP2020/050152 filed Jan. 7, 2020, which claims priority to German Patent Application No. 10 2019 101 823.4 filed Jan. 25, 2019, the disclosure of which is incorporated herein by reference in its entirety and for all purposes.

The present invention relates to a blade for a blender, for example a hand blender or a jug blender. Blenders are typically used for comminuting and/or pureeing and/or blending foodstuffs in households and/or the hospitality sector.

Blenders typically comprise rotating blades. Blades of this type in most instances comprise a centrally disposed opening into which a drive shaft for the rotation of the blades is introduced, for example. The blades therefore in most instances have at least two blade portions which lie opposite the opening and which have in each case cutters which are aligned in a circumferential direction. Blades which have not only two but three, four, or more cutters are also known. The arrangement of the blade portions takes place in particular such that the rotation is possible without any imbalance. Multiple-part blades are also known, wherein blade elements, which are (releasably) connected, conjointly form a multi-cutter blade.

The cutting performance of the blades is in particular a function of the sharpness of said blades. The greater the sharpness of the blade the higher the cutting performance. Rotating blades for blenders to date are ground so as to be dull because cutting edges of rotating blades that are ground so as to be sharp can easily break when impacting hard ingredients to be cut. This can ultimately lead to a breakage of the blade. A high degree of operational reliability is thus disadvantageously associated with a minor cutting performance.

It is therefore an object of the invention to at least partially solve the issues discussed in the context of the prior art, and to in particular specify a blade for a blender that has a high degree of operational reliability and at the same time a high cutting performance.

These objects are achieved by a blade according to the features of the independent claim. Further advantageous embodiments of the blade are set forth in the dependent claims. It is to be pointed out that the features which are individually stated in the dependent claims can be combined with one another in any arbitrary, technologically expedient, manner and define further embodiments of the invention. Moreover, the features set forth in the claims are explained in more detail and discussed in the description, wherein further preferred embodiments of the invention are illustrated.

Contribution toward the above is a blade for a blender, comprising at least the following features:
 a rotation axis;
 at least one knife which extends so as to proceed from the rotation axis and has at least one cutter; and
 a plurality of serrations which are configured in the at least one cutter, wherein the individual serrations are in each case mutually spaced apart by a flat portion of the at least one cutter;
 wherein the flat portion of the at least one cutter has a sharpness that is inferior to that of the serrations.

A hand blender is in particular a kitchen appliance which when in use is typically guided by a hand of the user. Such hand blenders therefore preferably have a weight of at most 5 kilograms. The hand blender can have a housing which is in particular at least partially composed of plastics material and/or metal. Furthermore, the hand blender can have a cutting head, in particular on a longitudinal end of the housing. The blade is able to be fastened in the region of the cutting head, in particular to a drive shaft of the hand blender.

A jug blender is a stationary appliance, formed by or composed of a stationary base having a closed vessel which is made of stainless steel, glass or transparent plastics material and fastened to said stationary base. The blade in a jug blender is disposed on the base of the vessel and by way of a clutch is able to be set in (rapid) rotation by the electric motor in the stationary base.

The blade by way of the drive shaft, or the clutch, respectively, is able to be rotated about a rotation axis of the blade at a rotating speed of, for example, 0 to 20,000 rpm (rotations per minute). The blade is in particular at least partially composed of (hardened) metal or sheet metal. The metal or the sheet metal can in particular comprise 0.1 to 0.5% by weight (percent by weight) of carbon, preferably (around) 0.2% by weight of carbon, and/or in particular have a hardness of 42 to 46 HRC (hardness according to Rockwell, scale C).

The blade comprises at least one knife. The blade preferably has two, three, or four knives. The at least one knife, from the rotation axis of the blade, extends in particular in a radial direction. If the blade has a plurality of knives, the knives are preferably disposed so as to be distributed uniformly about the rotation axis. In a blade having two knives, the knives can be disposed so as to be offset by 180° about the rotation axis, for example. A blade having two knives lying opposite one another can be configured so as to be integral, or in one piece, respectively. In a blade having three knives, the knives can be disposed so as to be offset by 120° about the rotation axis, for example. In a blade having four knives, the knives can be disposed so as to be offset by 90° about the rotation axis. A blade having 2×2 knives lying opposite one another can be configured so as to be integral, or in one piece, respectively, or else be configured from two blade elements each having two knives. Each knife can have at least one cutter. The at least one cutter is in particular a sharp, or sharpened, respectively, edge of the at least one knife.

The knife, proceeding from the rotation axis, extends substantially in a radial or lateral direction. It can be provided that the knife tapers from the central region of the rotation axis up to the external periphery (when viewed in the direction of the circumference or a width, respectively). The serrations can in each case configure a local maximum and minimum of a width of the knife.

A plurality of serrations (optionally also to be referred to as concavities) are configured in the at least one cutter. The number of serrations per cutter or knife, respectively, is preferably less than 10, in particular less than 5, and preferably 2, 3 or 4. All cutters of the blade preferably have the same number of serrations.

In a view onto the blade, thus when viewed in the direction of the rotation axis of the blade, the serration runs along the knife. The separations protrude in an arcuate manner into the at least one cutter. Regions of the cutter that are not covered by the serrations protrude in relation to the serration, particularly in the circumferential direction of the blade. A cutting edge of the at least one cutter in the region of the serrations runs so as to be undulated. Moreover, the serrations run in particular so as to be neither in part-circle shape, that is to say in particular not at a constant radius of curvature, nor sinusoidal. Moreover, the serrations of a knife are in particular not configured so as to be mirror-symmetrical. Furthermore, the serrations run in particular so as to be perpendicular to the rotation axis. The serrations are in particular sharpened and/or ground into the at least one cutter.

The individual serrations are in each case spaced apart by a flat portion of the at least one cutter. The at least one flat portion is in particular not configured so as to be undulated. The at least one flat portion is in particular configured so as not be sharpened, or sharpened to a lesser extent (duller), than another region of the knife. The cutting edge of the flat portion can be radiused, for example by brushing with a polishing paste. The average radius is (typically) not more than 0.25 mm.

The flat portion thus advantageously has a high degree of edge stability. Furthermore, the at least one flat portion can have at least one planar region, or a region which has been ground so as to be planar, respectively. In the region of the flat portion the at least one cutter (when viewed from above/below) can in particular have a straight cutting edge. The cutting edges of all flat portions of a single knife can run so as to be in particular mutually parallel and/or be mutually aligned.

When impacting the flat portion during the operation of the hand blender, the ingredients to be cut can in particular be more intensely smashed rather than cut in comparison to the serrations. The flat portions (at best) ensure that hard ingredients to be cut are pre-cut and initiate a deflection of the ingredients to be cut in the direction toward the serrations.

The flat portion of the at least one cutter can have a sharpness which is inferior to that of the serrations. The flat portion can in particular have a larger cutter thickness, or facet thickness, respectively, than the serrations or a radiused cutting-edge. The cutter thickness, or the facet thickness, respectively, is in particular a thickness of the cutting edge of the at least one cutter. The smaller the cutter thickness, or of the facet thickness, respectively, the sharper the at least one cutter.

The serrations can have a first cutter thickness of at most 0.2 mm (millimeters). The flat portion can have a second cutter thickness of 0.2 to 1.0 mm. The serrations have in particular a first cutter thickness between 0 and 0.2 mm, preferably 0 mm. Independently thereof, or in combination therewith, the flat portion has in particular a second cutter thickness of 0.2 to 0.6 mm, or preferably 0.2 to 0.4 mm.

The combination of the serrated regions with a sharp cut and duller or radiused, respectively, cutting edges of the flat portion enables an overall high degree of cutting-edge stability and prevents a breakage of the blade. A high cutting performance associated with a simultaneously high degree of operational reliability is thus advantageously achieved.

The serrations can run from a radially inward serration starting point to a radially outward serration finishing point, wherein a first spacing between the serration starting point and the apex of the serration is smaller than a second spacing between the apex and the serration finishing point. The serration starting point and the serration finishing point lie in particular on a cutting edge of the cutter. The serration starting point is in particular that point where the undulated region of a serration starts, and the serration finishing point is in particular that point where the undulated region of the serration finishes. The serration starting point is closer to the rotation axis than the serration finishing point. The apex of the serration is in particular that point of the serration where the serration has the maximum depth thereof. Furthermore, the serration can in particular have the smallest radius of curvature thereof in the apex. The radius of curvature of the serration, proceeding from the apex, can have a smaller gradient in the direction of the serration starting point that in the direction of the serration finishing point. The depth is in particular a perpendicular spacing between an (imaginary) straight connecting line, which runs in particular between the serration starting point and the serration finishing point, and the serration. A first spacing between the serration starting point and the apex is smaller than a second spacing between the apex and the serration finishing point.

The serrations at the serration starting point can have a first gradient, and at the serration finishing point have a second gradient, wherein the value of the first gradient differs from the value of the second gradient. The term "value" here in the typical mathematical context is understood to be a spacing from zero ("0").

A first tangent that contacts a first center between the serration starting point and the apex can intersect a central axis of the at least one knife so as to form a first angle, and a second tangent that contacts a second center between the apex and the serration finishing point can intersect the central axis so as to form a second angle. The term "tangent" here is also understood in the typical mathematical context. The first center on the serration is situated precisely between the serration starting point and the apex. This can in particular mean that the first center has the same spacing from the serration starting point as from the apex. The second center on the serration is situated precisely between the apex and the serration finishing point. This can in particular mean that the second center has the same spacing from the apex as from the serration finishing point. The first tangent is in particular an imaginary straight line which contacts the cutting edge of the serration at the first center. The first tangent of the serration that contacts the first center intersects the central axis of the knife so as to form a first angle. The second tangent is in particular an imaginary straight line which contacts the cutting edge of the serration at the second center. The second tangent of the serration that contacts the second center intersects the central axis of the knife so as to form a second angle.

The first angle can be larger than the second angle.

The first angle can be more than 50° and less than 90°. The first angle is preferably 60° to less than 90°, particularly preferably 70° to less than 90°.

The second angle can be 10° to 45°.

As a result of the proposed design embodiment of the first angle and of the second angle, it is achieved that the ingredients to be cut in the region of the serrations, between the apex and the serration finishing point, impact at an (approximately) right angle such that a very high cutting performance of the blade is achieved. Moreover, the region of the serrations between the apex and the serration starting point is smaller than the region of the serrations between the apex and the serration finishing point. Keeping the region between the apex and the serration starting point small, likewise has a positive effect on the cutting performance of the blade, because the ingredients to be cut, in the region between the apex and the serration starting point, impact the cutter only at an acute angle.

A depth of the serrations can correspond to at most 50% of a serration width of the serrations. The depth is in particular a perpendicular spacing between an (imaginary) straight connecting line, which runs between the serration starting point and the serration finishing point, and the serration. The serration width extends in particular from the serration starting point to the serration finishing point.

The knife can be embodied so as to be planar, curved and/or (partially) kinked. It is in particular possible for a uniform curvature or plane to be configured in the region which (in circumferential direction) is adjacent to the cutter, wherein another curvature and/or orientation of the knife is configured in the region close to the rotation axis and/or in the region is to the external periphery. The external periphery of the knife can be embodied with a winglet which is bent upward or downward.

The depth of the serration is preferably at least 2 mm, in particular between 2.8 mm and 3.7 mm.

The serration width of the serration is preferably at least 5 mm, in particular between 6 mm and 10 mm.

The serrations of one cutter preferably always have the same ratio of depth to serration width. The ratio of depth to serration width is preferably in the range from 0.3 to 0.5, in particular in the range from 0.35 to 0.4.

The invention as well is the technical environment will be explained in more detail hereunder by means of the figures. It is to be pointed out that the figures show a particularly preferred variant of embodiment of the invention, the latter however not being limited thereto. Identical components in the figures here are provided with the same reference signs. In the figures, in an exemplary and schematic manner:

Figure 4:
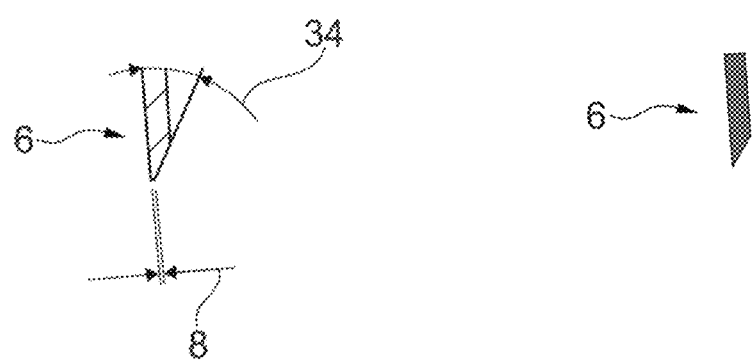
FIG. 4 shows a first variant of the serration having a cutter thickness>0 mm in a sectional illustration.
Figure 5:
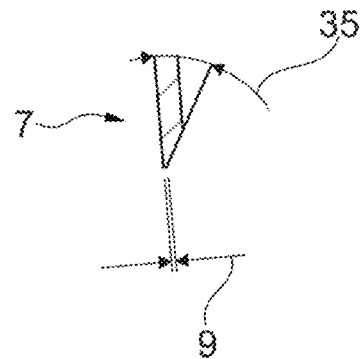
Figure 6:
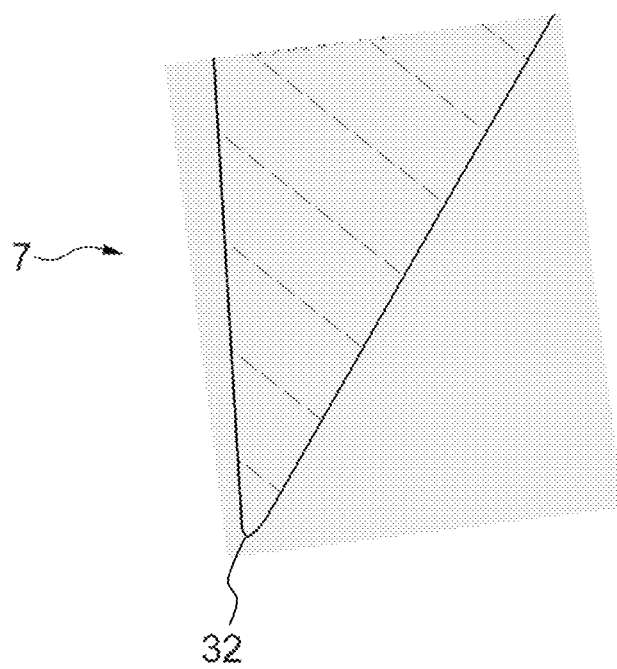

FIG. 4* shows a second variant of the serration having a cutter thickness=0 mm in a sectional illustration;

FIG. 5 shows a first variant of a flat portion of the cutter having a cutter thickness>0 mm in a sectional illustration; and FIG. 6 shows a second variant of a flat portion of the cutter having a radiused cutting edge in a sectional illustration.

Figure 1:
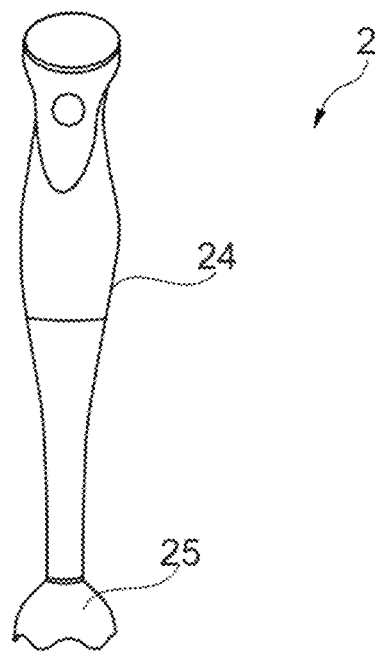
FIG. 1 shows a hand blender in a lateral view.

FIG. 1 as an exemplary field of application of the blade according to the invention shows a hand blender 2 in a lateral view. The hand blender 2 comprises a housing 24 having a cutting head 25. A blade 1, which is not visible here, is disposed in the cutting head 25, said blade 1 during the operation of the hand blender 2 for comminuting ingredients to be cut being rotatable by a drive of the hand blender 2.

Figure 2:
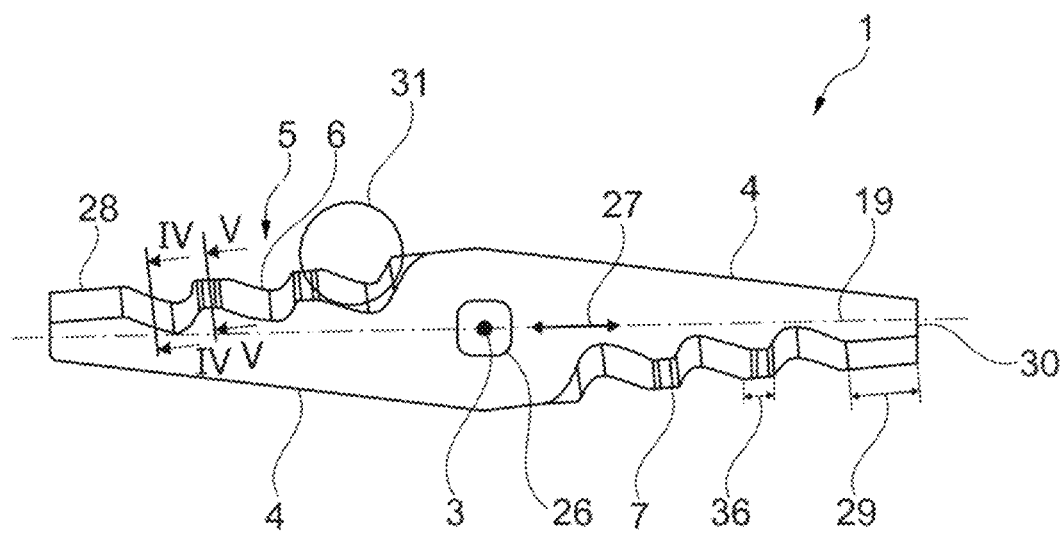
FIG. 2 shows a blade in a plan view.

FIG. 2 shows the blade 1 in the plan view, that is to say from the bottom to the top in FIG. 2. The blade 1 in the center thereof has an opening 26 for a drive shaft of the hand mixer 2 shown in FIG. 1, the blade 1 by said drive shaft being rotatable about a rotation axis 3. The rotation axis 3 here runs perpendicular to the drawing plane. In the variant of embodiment shown here, two knives 4 extend from the rotation axis 3 in two opposite radial directions 27. The knives 4 have a central axis 19. The central axis 19 here runs through the rotation axis 3 and so as to be centric through the knives 4. One cutter 5 is configured on each knife 4, said cutter 5 in the variant of embodiment shown here having in each case three serrations 6. The serrations 6 are ground into the cutters 5 and in the radial direction 27 mutually spaced apart by flat portions 7 of the cutter 5. The flat portions 7 have a portion width 36 which here is 3 mm. The serrations 6 are therefore mutually spaced apart by the portion width 36. The cutters 5 furthermore have in each case a flat end region 28 having an end region width 29 of at least 5 mm. The flat end region 28 extends from the radially outermost serration 6 to a tip 30 of the knives 4. The tips 30 of the knives 4, as opposed to the variant of embodiment shown in FIG. 2, can also be bent upward.

Figure 3:
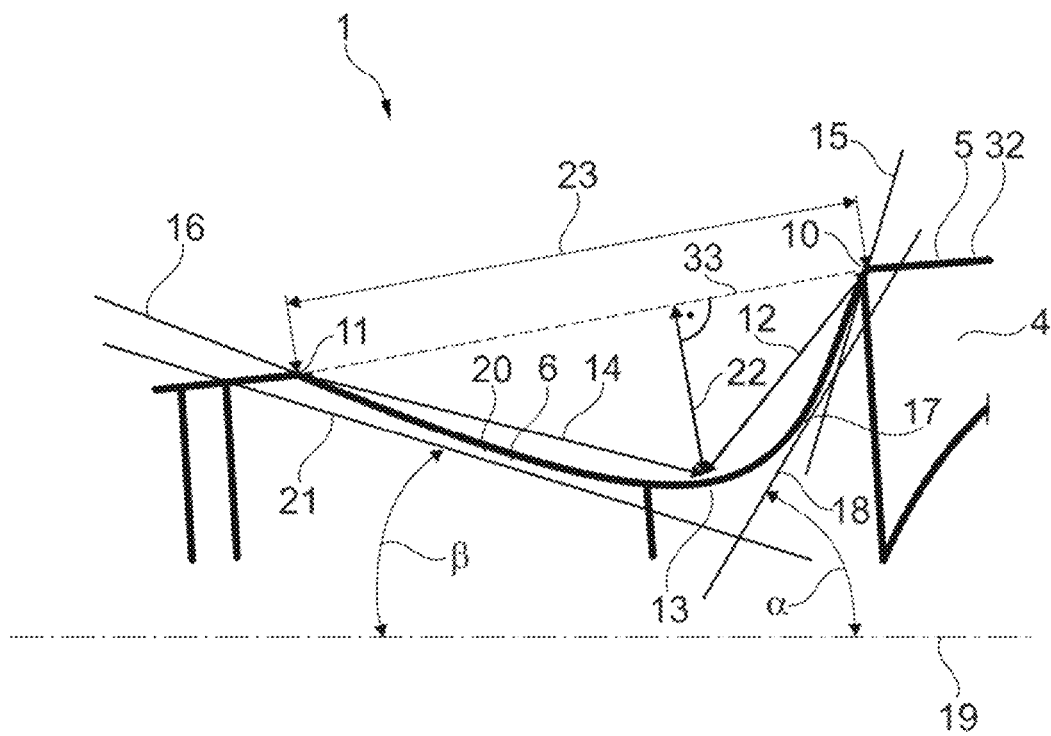
FIG. 3 shows a serration of a cutter of the blade in an enlarged illustration.

FIG. 3 shows an enlarged illustration of the serration 6 in the region 31 of the knife 4, as marked in FIG. 2. The serration 6 extends from a radially inward serration starting point 10 to a radially outward serration finishing point 11. The serration starting point 10 and the serration finishing point 11 lie on a cutting edge 32 of the cutter 5. The serration 6 moreover has an apex 13. The apex 13 is that point of the serration 6 where the serration 6 has the maximum depth 22 thereof. Furthermore, the serration 6 has the smallest radius of curvature thereof in the apex 13. Proceeding from the apex 13, the radius of curvature of the serration 6 has a smaller gradient in the direction of the serration starting point 10 than in the direction of the serration finishing point 11. The depth 22 is the perpendicular spacing between a connecting line 33, which runs between the serration starting point 10 and the serration finishing point 11, and the serration 6. A first spacing 12 between the serration starting point 10 and the apex 13 is smaller than a second spacing 14 between the apex 13 and the serration finishing point 11. Moreover, the serration 6 has a serration width 23 which extends from the serration starting point 10 to the serration finishing point 11.

At the starting point 10, the serration 6 has a first gradient 15 in relation to the connecting line 33 and/or the cutting edge 32, and at the serration finishing point 11 has a second gradient 16 in relation to the connecting line 33 and/or the cutting edge 32. The value of the first gradient 15 is larger than the value of the second gradient 16.

Furthermore, the serration 6 has a first center 17 and a second center 20. The first center 17 on the serration 6 is situated precisely between the serration starting point 10 and the apex 13. In other words, this means that the first center 17 has the same spacing from the serration starting point 10 as from the apex 13. The second center 20 on the serration 6 is situated precisely between the apex 13 and the serration finishing point 11. In other words, this means that the second center 20 has the same spacing from the apex 13 as from the serration finishing point 11. A first tangent 18 of the serration 6 that contacts the first center 17 intersects the central axis 19 of the knife 4 so as to form a first angle α. A second tangent 21 of the serration 6 that contacts the second center 20 intersects the central axis 19 of the knife 4 so as to form a second angle β. The first angle α here is 60°, and the second angle β is 17°. In the rotation of the blade 1, the ingredients to be cut, not shown here, as a result thereof impact the portion of the serration 6 between the apex 13 and the serration finishing point 11 approximately at an angle of 90°, as a result of which a high cutting performance of the blade 1 is achievable.

FIG. 4 shows a section through a first variant of the serration 6, along the section line IV-IV shown in FIG. 2. The serration 6 has a first cutter thickness 8 of 0.1 mm and a first cutting angle 34 of 33°.

FIG. 4* shows a section through a second variant of the serration 6, along the section line IV-IV shown in FIG. 2. The serration 6 has a first cutter thickness 8 of 0 mm and thus a cutter which is ground to the maximum sharpness.

FIG. 5 shows a section through a first variant of the flat portion 7, along the section line V-V shown in FIG. 2. The flat portion 7 has a second cutter thickness 9 of 0.4 mm and a second cutting angle 35 of 28°.

FIG. 6 shows a section through a second variant of the flat portion 7, along the section line V-V shown in FIG. 2. The flat portion 7 has a radiused cutting edge 32.

The blade is distinguished by a particularly high degree of operational reliability as well as by a particularly high cutting performance.

LIST OF REFERENCE SIGNS 1 blade
2 hand blender
3 rotation axis
4 knife
5 cutter
6 serration
7 flat portion
8 first cutter thickness
9 second cutter thickness
10 serration starting point
11 serration finishing point
12 first spacing
13 apex
14 second spacing
15 first gradient
16 second gradient
17 first center
18 first tangent
19 central axis
20 second center
21 second tangent
22 depth
23 serration width
24 housing
25 cutting head
26 opening
27 radial direction
28 end region
29 end region width
30 tip
31 region
32 cutting edge
33 connecting line
34 first cutting angle
35 second cutting angle
36 portion width
α first angle
β second angle

The invention claimed is:

1. A blade for a blender, at least comprising:
a rotation axis;
at least one knife which extends so as to proceed from the rotation axis and has at least one cutter; and
a plurality of serrations which are configured in the at least one cutter, wherein individual serrations are in each case mutually spaced apart by a flat portion of the at least one cutter;
wherein the flat portion of the at least one cutter has a sharpness that is inferior to that of the serrations.

2. The blade as claimed in claim 1, wherein the serrations have a first cutter thickness of at most 0.2 mm, and the flat portion has a second cutter thickness of 0.2 to 1.0 mm.

3. The blade as claimed in claim 1, wherein the serrations run from a radially inward serration starting point to a radially outward serration finishing point, and wherein a first spacing between the serration starting point and an apex of the serration is smaller than a second spacing between the apex and the serration finishing point.

4. The blade as claimed in claim 3, wherein the serrations at the serration starting point have a first gradient, and at the serration finishing point have a second gradient, and wherein the value of the first gradient differs from the value of the second gradient.

5. The blade as claimed in claim 3, wherein a first tangent that contacts a first center between the serration starting point and the apex intersects a central axis of the at least one knife so as to form a first angle ($\alpha$), and a second tangent that contacts a second center between the apex and the serration finishing point intersects the central axis so as to form a second angle ($\beta$).

6. The blade as claimed in claim 5, wherein the first angle ($\alpha$) is larger than the second angle ($\beta$).

7. The blade as claimed in claim 5, wherein the first angle ($\alpha$) is more than 50° and less than 90°.

8. The blade as claimed in claim 5, wherein the second angle ($\beta$) is 10° to 45°.

9. The blade as claimed in claim 1, wherein a depth of the serrations corresponds to at most 50% of a serration width of the serrations.

10. The blade as claimed in claim 1, wherein the flat portion of the at least one cutter has a radiused cutting edge.

* * * * *